United States Patent Office 3,362,221
Patented Jan. 9, 1968

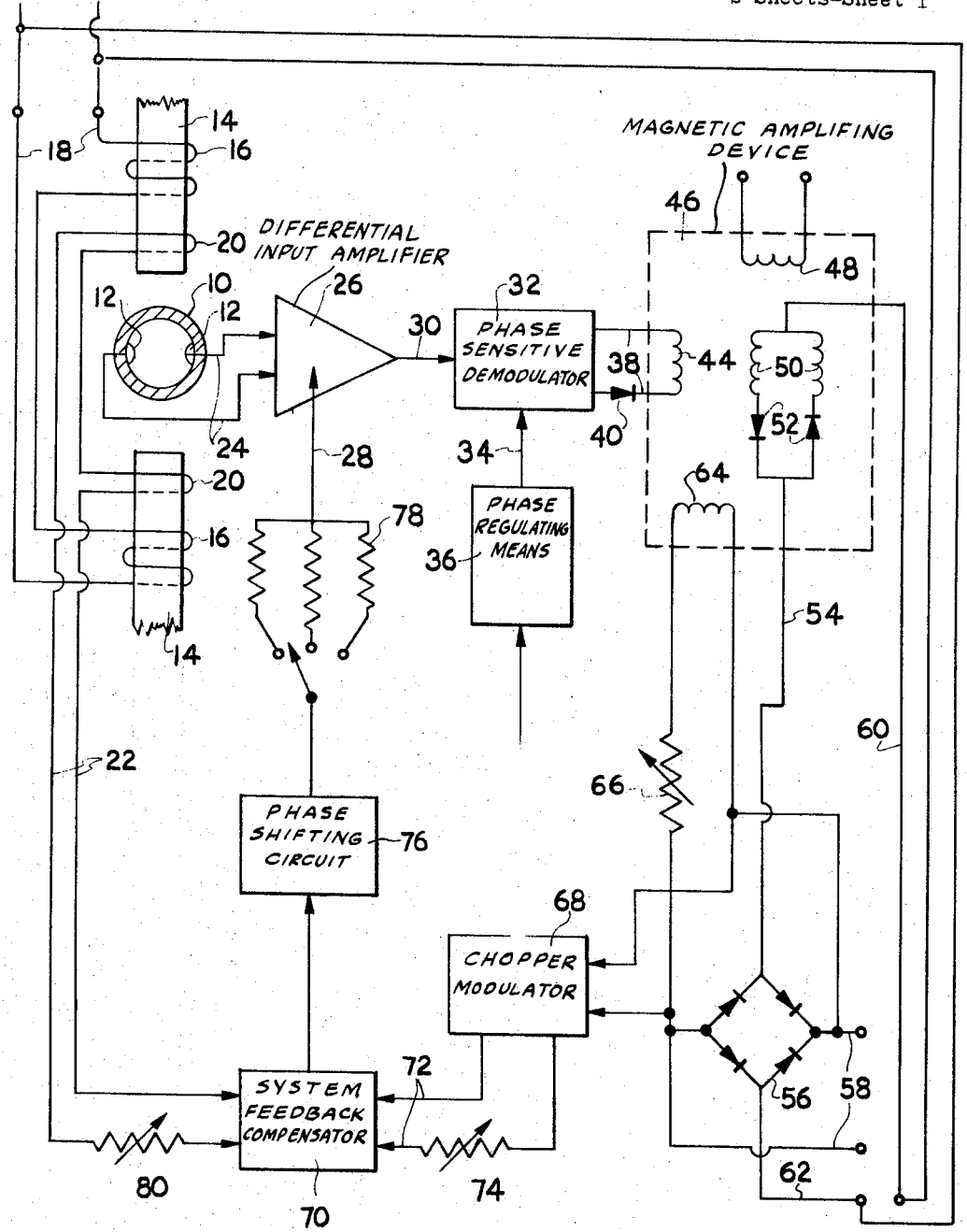

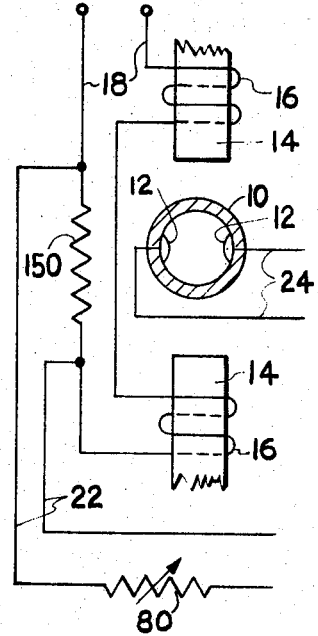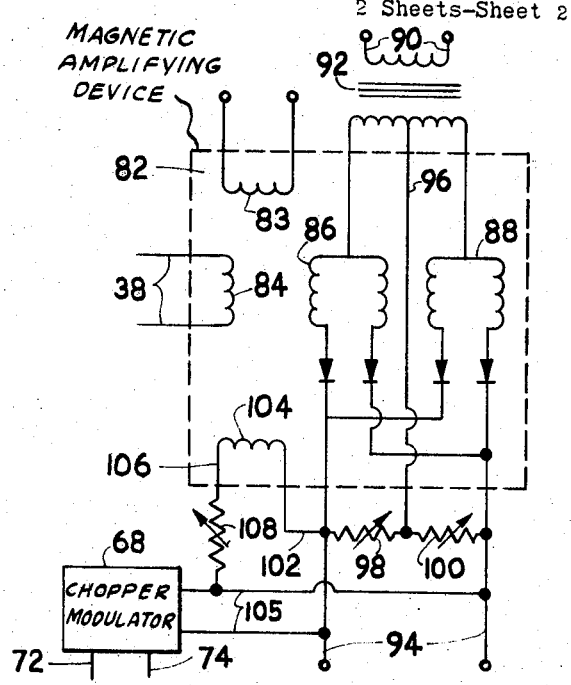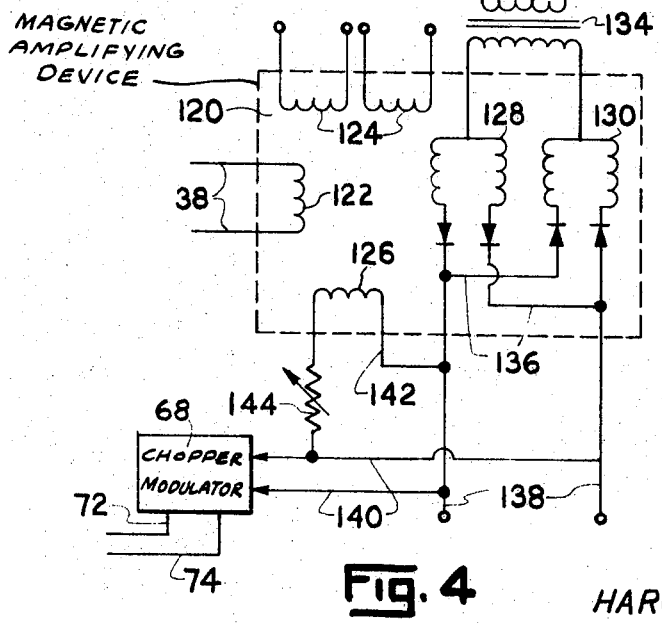

3,362,221
MAGNETIC FLOW TRANSMITTER SYSTEM
Harold E. Eller and Raul Salvat, Michigan City, Ind., assignors to The Hays Corporation, Michigan City, Ind., a corporation of Indiana
Filed June 30, 1964, Ser. No. 379,234
8 Claims. (Cl. 73—194)

This invention relates to a magnetic flow transmitter system, and more particularly to a direct current output solid state feedback flow transmitter system.

Flow measuring systems of the electromagnetic induction type utilize a conduit having opposed electrodes and means for creating a strong magnetic field transverse of the flow tube and between the electrodes. Liquid flowing in the tube flows across the magnetic field and in so doing causes a voltage to be induced across the electrodes. This voltage is amplified by an amplifier or a preamplifier, usually after an early comparison with a feedback signal. An error signal is thus produced which is then further amplified and conventionally drives an electromechanical detector to cause a mechanical motion. The resultant motion in turn alters or controls the amount of alternating current feedback to be applied at an early stage to the pre-amplifier for null balancing. The use of electromechanical transducers entails a number of disadvantages including high cost, complexity, lack of reliability, relatively large physical size, limited frequency response characteristics, and possibly ambient vibration interaction.

It is the primary object of this invention to provide an electromagnetic flow system which eliminates the need of any electromechanical feedback transducer and which is entirely electric in its operation.

A further object is to provide a system which can be contained in a housing which is of small physical size, and which may be contained within the main flow head case of the flow measuring system.

A further object is to provide a device of this character which has frequency response characteristics that are limited only to those which characterize a magnetic amplifying device.

A further object is to provide a self-contained magnetic flow meter with a two-wire output signal and which requires only an alternating current supply voltage from two additional wires, so that the user need not be concerned with various system connections between the flow head and the preamplifier and/or a recorder.

A further object is to provide a device of this character which can measure the flow of liquids of low conductivity without the limitations of prior devices with respect to location of separate electronic preamplifiers or receivers in close proximity to the flow sensing head of the device.

A further object is to provide an electromagnetic flow meter system having a DC output signal derived from a relatively low resistance source which does not require extensive shielding and which can be fed directly into electronic indicators, recorders, controllers, integrators, digital and analog computer systems and various transducers.

Other objects will be apparent from the following specification.

Referring to the drawings:
FIG. 1 is a wiring diagram illustrating our new direct current output electromagnetic flow system;
FIG. 2 is a fragmentary wiring diagram which illustrates an embodiment of the invention having a modified means for obtaining a reference voltage;
FIG. 3 is a fragmentary wiring diagram illustrating another modification of the invention to utilize a magnetic amplifying device in a circuit of the push-pull type;
FIG. 4 is a fragmentary wiring diagram illustrating another modification of the invention to utilize a magnetic amplifying device with a bridge type of connection to the remainder of the circuit.

Referring to the drawings, and particularly to FIG. 1, the numeral 10 designates a flow tube having a pair of diametrically opposed electrodes 12 therein. An electromagnet is provided with a pair of diametrically opposed pole members 14 positioned adjacent to the electrodes 12 and transversely of the tube 10, and substantially at right angles to a line between the electrodes 12. Windings 16 of the character commonly used in electromagnets are wound around poles 14 and are connected in series. Windings 16 are connected by leads 18 to a source of alternating current which excites the magnet poles 14 and induces a flux field extending across the flow tube 10 between electrodes 12. Reference voltage windings 20 are wound on the pole member 14 of the magnet structure and have leads 22 connected thereto.

Leads 24 are connected to electrodes 12 and serve to carry signals induced in electrodes 12 to the amplifier 26 which is of the high impedance multiple stage differential input type. The amplifier 26 also has connected thereto a lead 28 carrying a system feedback signal. The output of the amplifier 26 is amplified as an alternating current error signal transmitted by lead 30 to a phase sensitive modulator 32. The phase sensitive demodulator 32 is keyed by a signal fed by lead 34. The keying signal is in phase with the alternating current error signal supplied by lead 30, for example as determined by phase regulating means 36. This eliminates system response to unwanted signal quadrature voltages.

The output of the phase sensitive demodulator 32 constitutes a direct current error signal transmitted by leads 38 which have a rectifier 40 interposed therein and are connected to the control winding 44 of a solid state magnetic amplifying device 46. The magnetic amplifying device 46 includes a bias winding 48, and output windings 50. The windings 50 of the magnetic amplifying device 46 are connected single ended and have oppositely oriented rectifier elements 52 connected thereto. It will be understood that the magnetic amplifying device 46 is of conventional construction and operates in well known manner. Its bias may be adjusted so that a zero direct current error signal will result in a desired level of current output in a lead 54. As a direct current error signal is applied at control windings 44, as caused by flow of liquid in the flow head 10, the direct current output of the magnetic amplifying device will increase correspondingly. In effect, the output windings 50 of the magnetic amplifying device act as a variable impedance whose value is decreased or increased according to an increase or decrease in the direct current error signal induced by an increase or decrease in fluid velocity in the flow tube 10. The increase or decrease in the impedance of the magnetic amplifier 46 causes the current in output windings 50 to vary accordingly.

A bridge rectifier 56 connected to lead 54 rectifies the current from the output windings 50 of the magnetic amplifier. This rectified current is taken from the bridge rectifier 56 by output leads 58 as a direct current milliampere output. It is desirable that smoothing of the output current be accompanied by normally accepted filtering means (not shown). Direct current output ranges of 1–5 ma., 4–20 ma., and 10–50 ma., are thus realizable with this circuit. A lead 60 connects the AC supply with the output windings 50 and a lead 62 connects the AC supply with the bridge rectifier 56.

The magnetic amplifier 46 has a feedback winding 64. A portion of the direct current milliamp output from the bridge rectifier 56 is applied to the feedback winding 64 through a variable resistor 66. The resistor 66 serves to adjust to a desired value the current applied to the feedback windings 64. The action of the magnetic amplifier feedback upon the magnetic amplifier output is degenerative and serves the purpose of maintaining a constant current output for a given direct current error signal input regardless of normal fluctuations in the alternating current voltage applied to the magnetic amplifier output windings at leads 60 and 62.

The system feedback signal applied at lead 28 is derived by sampling a portion of the direct current milliamp output at leads 58. Because the flow signal from the electrodes 12 of the flow tube passing through the leads 24 to the amplifier 26 is an alternating current signal and is of the same frequency as the frequency of the voltage supplied to the flow transmitter at least 18, the system feedback signal applied at lead 28 must also be an alternating current signal of this same frequency. To secure this feedback signal current and frequency, a chopper modulator 68 is connected to the output signal across leads 58. The chopper modulator 68 converts a sample portion of this direct current milliamp output into an alternating current signal which is compatible with the flow signal from the flow tube electrodes 12 passing through the amplifier 26. The circuit of the chopper modulator will preferably be of the solid state type using transistors connected in a switching arrangement. However, other types of choppers may be used, such as choppers of the electromagnetic type. Suitable means for filtering and shaping may be included in the chopper modulator 68 to obtain the desired alternating current wave form output.

The output of the chopper modulator 68 is fed to a system feedback compensator 70 through leads 72. One of these leads includes a variable resistor 74. The operation of the system feedback compensator 70 will be explained later. The output from the system feedback compensator 70 is fed into a phase shifting circuit 76 capable of adjusting the phase of the system feedback signal supplied to the amplifier 26 through lead 28. The phase shifting circuit is desirably adjusted so that the signal at lead 28 is 180 deg. displaced from the phase of the signal supplied by the leads 24. This phase control and regulation is necessary in order to accomplish a voltage subtraction at the summing point of a high impedance differential input amplifier 26. As a result of this subtraction, the magnitude of the alternating current error signal output of the amplifier 26 at lead 30 will be the vectorial sum of the flow signal at leads 24 and the feedback signal at lead 28. System feedback magnitude may be continuously adjusted by means of the variable resistor 74 so as to insure that after the summing action in amplifier 26 and demodulation in the demodulator 32, the direct current error signal flowing in leads 38 will be of the appropriate magnitude to produce a direct current milliamp output corresponding with the amount of flow signal voltage in leads 24 generated by fluid flow in the flow tube 10.

A range switch 78 is preferably connected in the lead 28 between the phase shifter 76 and the amplifier 26. The range switch provides current flow paths of different resistance selectively operable by manual adjustment to accurately extend the range of the direct current milliamp output corresponding to a given flow signal supplied by the leads 24 to the amplifier 26 in predetermined steps.

The diode 40 in the output lead 38 from the demodulator 32 is utilized to avoid regenerative system feedback action by blocking reverse polarity of the direct current error signal in the lead 38.

The system feedback compensator 70 is used in the circuit to automatically adjust the amount of system feedback signal so that a constant milliamp output is obtained at the output leads 58 for a constant flow of fluid in the flow tube 10 regardless of fluctuations in the alternating current voltage supply at leads 18, 60 and 62, and particularly fluctuations acting upon the electromagnet 14.

Because the flow signal taken off at electrodes 12 through the leads 24 and the reference voltage derived at the windings 20 and fed by leads 22 to the system feedback compensator 70 are induced by a common flux occurring in the electromagnet 14 in response to alternating current energization, any fluctuation in the alternating current supply voltage in leads 18 will cause a corresponding change in both the flow signal in leads 24 and the reference voltage in leads 22. A change in the signal in leads 24 resulting from fluctuations in the alternating current supply voltage will produce as an end result a change in the direct current milliamp output of the device at leads 58. The system feedback signal in lead 28 being derived from the output signal at the leads 58 will also change. Thus, were it not for the system feedback compensator 70, the direct current milliamp output at leads 58 would also be sensitive to line voltage fluctuations supplied at leads 18, 60 and 62.

The reference voltage fed through leads 22 to the system feedback compensator 70 may be adjusted at a desired level by means of the variable resistor 80. The feedback compensator 70 preferably consists of a photosensitive diode such as a Raysistor or an equivalent circuit element. The reference voltage in leads 22 will control the amount of illumination striking the photosensitive diode. The output of the chopper modulator 68 is connected to the diode section of the feedback compensating device. When a change in the alternating current supply fed at leads 18, 60 and 62 occurs and causes a corresponding change in the signal voltage in leads 24 and reference voltage in the leads 22, the compensator 70 acts as a variable resistor to automatically adjust the value of the system feedback signal supplied to the amplifier 26 by the lead 28 without allowing the direct current milliamp output at the leads 58 to vary. In this manner the ratio of the flow signal passing through leads 24 to the system feedback signal fed at lead 28 is maintained constant as long as the rate of fluid flow through the flow tube 10 remains constant and regardless of changes in the supply voltage of alternating current in leads 18, 60 and 62.

Although the system feedback compensator 70 is preferably a photosensitive diode, other types of devices may be utilized to accomplish the same result. Thus the compensator may be a field effect transistor, a standard transistor or a vacuum tube circuit, or a magnetic type device.

In the operation of the electromagnetic flow meter system, a predetermined level of DC error current must flow from the demodulator 32 to the magnetic amplifying device 46 at the control winding 44 in order to support a continuous output current at output leads 58. The level of this input direct current flow to support a given output at the output leads 58 will be a function of the gain which characterizes the magnetic amplifier 46; that is, it will be a function of the slope of the magnetic amplifier B–H curve. By selecting a magnetic amplifier 46 having a relatively high gain for use in the system, a small change in the level of the input direct current flow to the magnetic amplifier will drive the magnetic amplifier to produce an output current at the output terminals 58 through the full range desired, that is, between a minimum and maximum output. Thus practical levels of overall system sensitivity can be achieved.

While the electromagnetic flowmeter system as described is particularly suited through the connection of milliamp output at 58 which is other than zero; for example, the output windings 50, for a minimum direct current ample, systems requiring outputs of the order of 1–5 milliamperes, 4–20 milliamperes, or 10–50 milliamperes; there are systems where an absolute zero output is required, such as systems requiring outputs from zero to four milliamps, or from zero to sixteen milliamps, or zero to forty milliamps. Such requirements can be met with a push-pull type magnetic amplifier, as illustrated in FIG. 3. In this arrangement, magnetic amplifier 82 has control winding 84 to which a direct current error signal is supplied through leads 38 from a phase sensitive demodulator in the same manner as in the FIG. 1 construction. The magnetic amplifier 82 has output windings 86 and 88 which are supplied from an alternating current source at leads 90 through a center tapped transformer 92. The output windings 86, 88 are connected in a push-pull arrangement. The push-pull connection of the output windings 86, 88 produces a full wave direct current milliamp output at the output terminals 94. In this way, the use of a bridge rectifier as shown in FIG. 1, connected to the output windings of the magnetic amplifier, may be eliminated. It is desirable that smoothing at the direct current output be accomplished by normally accepted filtering means (not shown). A lead 96 is connected at a center tap of transformer 92, and mixing resistors 98 and 100 are connected across the output leads 94 in series and have the lead 96 center tapped therebetween. A lead 102 from the mixing resistors 98 and 100 is connected to feedback winding 104 of the magnetic amplifier. Leads 105 connect the output terminals 94 with chopper modulator 68 to enable the system feedback signal to be derived from the output leads 94, as previously described. Lead 102 and a lead 106 connect the feedback winding 104 across the output leads 94 by tapping of lead 102 to one of the leads 94, and the lead 106 to the other of said output leads 94. A variable resistor 108 is preferably interposed in the lead 106.

The magnetic amplifier of FIG. 3 will preferably have a bias winding 83 in addition to the control winding 84, the output windings 86 and 88, and the feedback winding 104. The use of the magnetic amplifier of FIG. 3 with its push-pull arrangement of the output windings 86 and 88 makes the device suitable for use when outputs of both the absolute zero and other than zero characters abovementioned are desired. Where an absolute zero output is desired, the mixing resistors 98 and 100 are of equal value. This produces a zero direct current milliamp output in leads 94 when the direct current error signal supplied to control winding 84 through the leads 38 is zero. When other than a zero output is desired, either of the mixing resistors 98 or 100 may be varied to obtain the required direct current output at leads 94 when the direct current error signal applied through leads 38 to the control winding 84 is zero. The polarity of the output at the leads 94 which is desired will determine which of the resistors 98 or 100 is to be adjusted or varied. An electromagnetic flowmeter system utilizing a push-pull magnetic amplifier and connected as shown in FIG. 3 to the remainder of the circuit produces a system whose operation is identical to the operation of the circuit shown in FIG. 1 except for the accommodation of absolute zero and other than zero outputs, as aforementioned.

FIG. 4 illustrates another change in the magnetic amplifier and its connection in the circuit shown in FIG. 1. In this arrangement, a magnetic amplifier 120 is provided with control winding 122 supplied with a direct current error signal through leads 38 from the demodulator of the circuit arrangement shown in FIG. 1. Magnetic amplifier 120 in this instance is provided with a pair of bias windings 124 and with a feedback winding 126. Output windings 128 and 130 of the magnetic amplifier 120 are provided with an alternating current supply through transformer 134 which is connected to an alternating current source at leads 132. The output windings 128 and 130 of the magnetic amplifier are connected by leads 136 in a Wheatstone bridge arrangement. A direct current milliamp output is supplied by the bridge connected output windings 128 and 130 at the output leads 138, which direct current output is of the half wave type and does not require the use in the transmitter system circuit of a bridge rectifier of the type required in FIG. 1, as at 56. It is desirable that smoothing of the output signal be accomplished by normally accepted filtering methods.

The feedback signal used in the system is derived from the direct current output leads 138 through leads 140 which are connected to chopper modulator 68, which in turn is connected by leads 72 to the remainder of the electromagnetic flowmeter system, as in FIG. 1. The feedback winding 126 is also connected across the DC output leads 138 by leads 142, one of which has a variable resistor 144 connected therein.

The Wheatstone bridge circuit arrangement of FIG. 4 can be used to provide outputs at output leads 138 of both absolute zero and other than zero character. When an output of absolute zero is required, each pair of output windings 128 and 130 is equally and independently biased by the bias windings 124. When other than zero output is required, one of the bias windings 124 is adjusted relative to the other until the desired output is obtained. The desired polarity of the output will determine which of the bias windings 124 is to be adjusted. Except for the capability of the FIG. 4 arrangement to be used to produce outputs of both absolute zero and other than zero character as aforementioned, the operation of the magnetic amplifier 120 and of the other components of the system with which it is connected, as shown in FIG. 1, is similar to that described for the circuit shown in FIG. 1.

Another modification of the circuit shown in FIG. 1 illustrating a modified way of obtaining a reference voltage in leads 22 connected to the system feedback compensator 70 of the electromagnetic flowmeter system, is illustrated in FIG. 2, wherein parts similar to those shown in FIG. 1 bear the same reference numerals. In this arrangement, a resistor 150 is interposed in one of the leads 18 supplying alternating current to the windings 16 of the electromagnet structure 14. The leads 22 are connected at opposite sides of the resistor 150. It will be apparent that since the magnetic flux produced by the electromagnet structure 14 is proportional to the alternating current input at leads 18, the reference voltage which is derived at leads 22 from the voltage drop across the resistor 150 will vary in proportion to the flow signal generated in leads 24 connected with the electrodes 12 in the flow tube as variations occur in the alternating current supplied to the device through the leads 18. This provides the necessary compensation for proper functioning of the system, as described above.

It will be seen that in all embodiments of the device, the entire system is electronic and the frequency response characteristics are limited only to the frequency response characteristic of the magnetic amplifying device utilized. The system makes possible a self-contained flowmeter requiring only a two-wire alternating current supply and a two-wire direct current output. Thus the user need not be concerned wiht various connections in the system between the flow head and the preamplifier or recorder of the system and resultant advantages of convenience and saving of cost occur.

Of importance in the system is the elimination of electro mechanical transducers, the elimination from the system of unwanted signal quardrature voltages, the functioning of the output windings of the magnetic amplifiers as variable impedances responsive to variations of the direct current signal supplied from the demodulator 32, and the maintenance of a constant direct current output for a given direct current error signal input regardless of normal fluctuations of line voltage or AC current which supplies the system. Another advantage of the unit is that it permits a flow head to measure fluids of low conductivity, in that the limitation of the fluid conductivity is a function of the internal capacitance of the electronic system, and the amplifier input impedance, and is not a function of the capacitance of the signal cable. In other words, usual limitations of systems of this character resulting from long signal cables are eliminated, so that extensive shielding is not required as has been customary in prior electromagnetic flowmeter systems.

Another important consideration of the device is the use of the magnetic amplifier as an error detecting device to produce a feedback signal in the system which replaces the commonly used electromechanical detectors of prior electromagnetic flowmeter systems, and the increase of the frequency response of the system due to its all electronic character.

Still another important consideration in the system is the use of feedback compensation to obtain stability in the system with alternating current supply voltage variations.

While the preferred embodiments of the invention have been illustrated and described, it will be understood that changes in the system may be made within the scope of the appended claims without departing from the spirit of the invention.

We claim:

1. A magnetic flow transmitter system, comprising a liquid flow tube having opposed electrodes,
   means energized by alternating current for creating a magnetic field transverse of said tube adjacent said electrodes,
   a differential input amplifier connected to said electrodes to amplify signal voltage induced thereacross,
   feedback means for imposing on said differential input amplifier a feedback signal partly derived from said magnetic field creating means to produce an alternating current error signal,
   a phase sensitive demodulator responsive to said error signal and having a direct current error signal output,
   a magnetic amplifier responsive to said direct current error signal,
   means for producing a direct current output responsive to the output of said magnetic amplifier, and
   a chopper modulator fed by said direct current output, being connected to said feedback means for modulating said feedback signal in cooperation with said field creating current.

2. A magnetic flow transmitter system, comprising a liquid flow tube having opposed electrodes,
   means energized by alternating current to create a magnetic field across said tube adjacent said electrodes,
   a differential input amplifier responsive to the signal generated at said electrodes,
   feedback means responsive in part to the field creating current for imposing on said differential input amplifier a feedback comparison signal,
   a phase sensitive demodulator receiving the output of said amplifier,
   means keying said demodulator in phase with the output of said differential amplifier and having a direct current error signal output,
   a solid state magnetic amplifier having a control winding to receive said direct current error signal from said demodulator and output windings energized by alternating current, and means responsive to said output from said output windings for producing a direct current output,
   means applying the direct current output of said magnetic amplifier to said feedback means to modulate said feedback signal in cooperation with said field creating current,
   said magnetic amplifier having a feedback winding connected to said last named means.

3. A magnetic flow transmitter system, comprising a liquid flow tube having opposed electrodes,
   means energized by alternating current to create a magnetic field across said tube adjacent said electrodes,
   a differential input amplifier responsive to a signal generated at said electrodes,
   means responsive in part to the field creating current for imposing on said amplifier a feedback signal summed vectorially with said electrode signal by said differential input amplifier,
   a phase sensitive demodulator receiving the output of said differential input amplifier and having a direct current output,
   means keying said demodulator in phase with the output of said differential amplifier,
   a solid state magnetic amplifier having a control winding to receive said direct current signal from said demodulator and having output windings, said output windings acting as a variable impedance responsive to the magnitude of said direct current signal,
   means supplying alternating current to the output windings of said magnetic amplifier,
   means responsive to the alternating current in said output windings of said magnetic amplifier for producing a direct current output, and
   means responsive to said direct current output and connected to said feedback signal imposing means to regulate said feedback signal.

4. A magnetic flow transmitter system, comprising a liquid flow tube having opposed electrodes,
   means energized by alternating current to create a magnetic field across said tube adjacent said electrodes,
   a differential input amplifier responsive to a signal generated at said electrodes,
   feedback means responsive in part to the field creating current for imposing on said differential input amplifier a feedback signal,
   a phase sensitive demodulator receiving and keyed in phase with the output of said differential input amplifier and having a direct current error signal output,
   a solid state magnetic amplifier having a control winding to receive said direct current error signal from said demodulator and having output windings energized by alternating current,
   rectifier means connected across the output windings of said magnetic amplifier,
   said magnetic amplifier having a feedback winding connected and responsive to the output of said rectifier means,
   said feedback means being connected and responsive to the output of said rectifier means, said feedback winding and field creating current.

5. A magnetic flow transmitter system, comprising a liquid flow tube having opposed electrodes,
   means energized by alternating current to create a magnetic field across said tube adjacent said electrodes,
   a differential input amplifier responsive to a signal generated at said electrodes,
   feedback means responsive in part to the field creating current for imposing on said amplifier a feedback signal to be vectorially summed with said electrode signal,
   a phase sensitive demodulator receiving the vectorially summed output of said amplifier and having a direct current output,
   means keying said demodulator in phase with said vectorial amplifier output,
   a solid state magnetic amplifier having a control winding to receive said direct current signal from said demodulator and having output windings activated by alternating current and having a push-pull output connection producing a direct current output,
   said magnetic amplifier having a feedback winding connected with said output windings, and
   means connecting said magnetic amplifier output and feedback windings to said feedback means whereby said magnetic amplifier acts as a variable impedance cooperating with said field creating current and modulating the feedback signal imposed on said differential input amplifier.

6. A magnetic flow transmitter system, comprising a liquid flow tube having opposed electrodes,
   alternating current means creating a magnetic field transverse of said tube between said electrodes,
   differential input means amplifying signal voltage induced across said electrodes,
   feedback means applying a feedback signal derived in part from said field creating means to said differential input amplifier to produce an error signal, error signal demodulating means keyed in phase with said error signal and having a direct current output, a magnetic amplifying device having selected sensitivity limits and actuated in joint response to the output of said demodulating means and to an alternating current supply, and direct current output means responsive to said magnetic amplifier, said magnetic amplifying device being connected to said feedback means whereby said feedback signal is jointly responsive to field creating current and the direct current output of said magnetic amplifier and is directly proportional to the voltage induced across the electrodes within the sensitivity limits of said magnetic amplifying device.

7. A magnetic flow transmitter system, comprising a liquid flow tube having opposed electrodes, means creating a magnetic field transverse of said tube between said electrodes, differential input means amplifying signal voltage induced across said electrodes, said field creating means having a primary alternating current supply, means deriving a reference signal from said primary current supply, feedback compensating means applying to said differential input amplifying means a feedback signal derived in part from said reference signal to produce an error signal at the output of said amplifying means, a demodulator keyed in phase with and receiving said error signal and having a direct current output, a magnetic amplifying device having a control winding connected to said demodulator and having a direct current output connected to said feedback compensating means to act as a variable impedance modulating said reference signal to produce the feedback signal imposed on said differential input amplifying means, said magnetic amplifying device including two pairs of output windings energized by alternating current connected in push-pull arrangement producing a direct current output, and variable means for selectively controlling the polarity and the magnitude of the direct current output of said magnetic amplifying device.

8. A magnetic flow transmitter system, comprising a fluid flow tube having opposed electrodes, alternating current means creating a magnetic field transverse of said tube between said electrodes, a differential input amplifier having a feedback signal and the signal voltage from said electrodes differentially applied at the input thereof, means to convert the output of said differential input amplifier to a direct current signal, a magnetic amplifier having a control winding receiving said direct current signal from said converting means, means to convert the output of said magnetic amplifier to a direct current signal, and means responsive in part to the direct current output signal of said magnetic amplifier and in part to the magnetic field creating means for imposing said feedback signal on the input of said differential input amplifier.

References Cited

UNITED STATES PATENTS

| | | | |
|---|---|---|---|
| 2,887,878 | 5/1959 | Kamp et al. | 73—194 |
| 3,131,560 | 5/1964 | Cushman et al. | 73—194 |
| 3,246,176 | 4/1966 | Nazareth | 73—194 |

JAMES J. GILL, *Acting Primary Examiner.*

RICHARD C. QUEISSER, *Examiner.*

C. A. RUEHL, *Assistant Examiner.*